United States Patent

Hinata et al.

[11] 3,986,878
[45] Oct. 19, 1976

[54] SILVER HALIDE PHOTOGRAPHIC EMULSION

[75] Inventors: Masanao Hinata; Haruo Takei; Akira Sato; Tadashi Ikeda, all of Minami-ashigara, Japan

[73] Assignee: Fuji Photo Film Co., Ltd., Minami-ashigara, Japan

[22] Filed: Sept. 4, 1975

[21] Appl. No.: 610,351

[30] Foreign Application Priority Data
Sept. 4, 1974    Japan............................. 49-101487

[52] U.S. Cl.................................. 96/69; 96/100; 96/124; 96/132
[51] Int. Cl.².......................................... G03C 1/14
[58] Field of Search ............... 96/124, 69, 131, 132, 96/100

[56] References Cited
UNITED STATES PATENTS

| | | | |
|---|---|---|---|
| 3,149,105 | 9/1964 | Larive et al............................ | 96/132 |
| 3,672,898 | 6/1972 | Schwan et al........................... | 96/124 |
| 3,752,670 | 8/1973 | Needler et al......................... | 96/132 |
| 3,847,613 | 11/1974 | Sakazume et al..................... | 96/132 |

*Primary Examiner*—J. Travis Brown
*Attorney, Agent, or Firm*—Sughrue, Rothwell, Mion, Zinn and Macpeak

[57] ABSTRACT

A silver halide photographic emulsion containing, in supersensitizing amounts, at least one sensitizing dye represented by the following general formula (I)

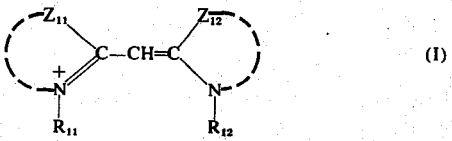

wherein $Z_{11}$ represents the atoms necessary to complete a thiazole nucleus, a selenazole nucleus, a benzothiazole nucleus, a benzoselenazole nucleus, a naphthothiazole nucleus or a naphthoselenazole nucleus; $Z_{12}$ represents the atoms necessary to complete a naphthothiazole nucleus, or a naphthoselenazole nucleus; and $R_{11}$ and $R_{12}$ each represents an aliphatic group with at least one of $R_{11}$ and $R_{12}$ having a carboxy or sulfo group; and at least one sensitizing dye represented by the following general formula (II)

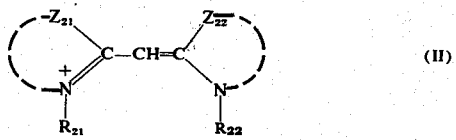

wherein $Z_{21}$ represents the atoms necessary to complete a thiazole nucleus, a benzothiazole nucleus, a naphthothiazole nucleus, a selenazole nucleus, a benzoselenazole nucleus or a naphthoselenazole nucleus; $Z_{22}$ represents the atoms necessary to complete an imidazole nucleus, a benzimidazole nucleus or a naphthoimidazole nucleus; and $R_{21}$ and $R_{22}$ each represents an aliphatic group with at least one of $R_{21}$ and $R_{22}$ having a carboxy or sulfo group.

17 Claims, 1 Drawing Figure

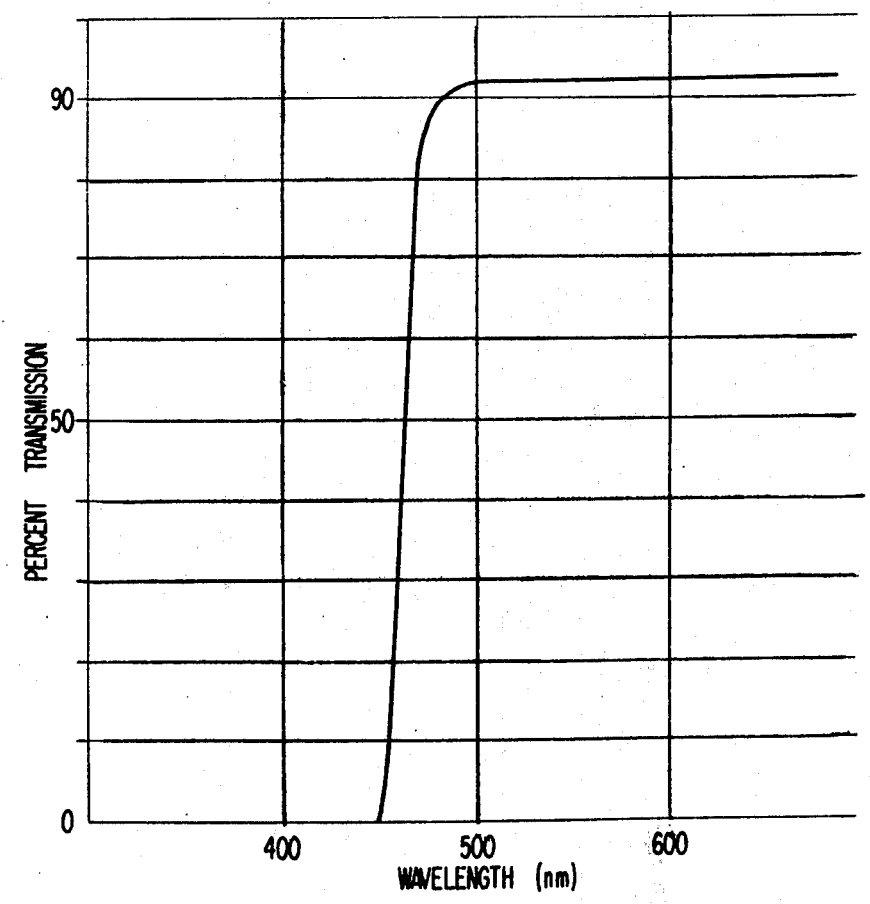

SILVER HALIDE PHOTOGRAPHIC EMULSION

BACKGROUND OF THE INVENTION

1. Field of the Invention

The present invention relates to a spectrally sensitized silver halide photographic emulsion and, more particularly, to a silver halide photographic emulsion supersensitized with a novel combination of two types of sensitizing dyes.

2. Description of the Prior Art

It is well known that the light-sensitive wavelength region of a silver halide photographic emulsion can be expanded and spectrally sensitized by adding a sensitizing dye to a silver halide photographic emulsion. In some cases, only one sensitizing dye is used to sensitize the emulsion to the desired spectral sensitization wavelengths. However, in many cases two or more sensitizing dyes are used in combination. When two or more sensitizing dyes are used in combination, the degree of spectral sensitization often is intermediate the degree achieved in using the two dyes alone or less than that achieved using the two dyes alone. In some cases, however, a specific combination of different types of sensitizing dyes markedly increases the degree of spectral sensitization as compared with the independent use of the sensitizing dyes. This phenomenon is usually called supersensitization by sensitizing dyes.

When such a combination is used, a shift of the spectral sensitization to a wavelength region which cannot be expected from the spectral sensitization of the independent use of the dyes will sometimes result, although the spectral sensitization wavelength usually is intermediate that of the two dyes used alone or is a mere combination of that of the two dyes used alone.

Discovery of the combination of sensitizing dyes which, when used in combination, can provide a higher degree of spectral sensitization as compared with their independent use and can exhibit a sensitization in a wavelength region suitable for the end-use of a photographic light-sensitive material has become an important subject in the art of spectrally sensitizing silver halide photographic emulsions.

In the combination of sensitizing dyes used for supersensitization, a great selectivity is required between the respective dyes, and an apparently small difference in the chemical structure greatly influences supersensitization. That is, which combination of sensitizing dyes will provide supersensitization is difficult to predict from only the chemical structures of the dyes employed.

The sensitizing dyes to be used in supersensitizing a silver halide photographic emulsion must not exert any detrimental action on the photographic additives other than the sensitizing dyes and should possess stable photographic properties upon storage of the light-sensitive materials.

Further, remaining color resulting from the sensitizing dyes to be used must not be left in a light-sensitive material after processing. In particular, in short time processing such as rapid processing (usually 3 seconds to 90 seconds), the dyes must not leave any remaining color. Particularly, this remaining color is undesirable with photographic papers. Because, in black-and-white photographs, a bright white cannot be obtained and, with color photographs, reproduction of a true color becomes impossible.

It is known to use sensitizing dyes in order to increase the sensitivity in the blue region, e.g., as disclosed in U.S. Pats. No. 3,752,670, 3,480,434, German Pat. Application (OLS) No. 2,303,204, Japanese Pat. Publication No. 30023/71, etc. However, the above-described sensitizing dyes used for the sensitization in the blue region do not possess sufficient photographic properties. That is, the simple merocyanine dyes described in U.S. Pat. No. 3,480,434, Japanese Pat. Publication No. 30023/71, etc., have the defect that they broaden the spectral sensitivity distribution of a silver halide emulsion to such a long wavelength side that even the green region is sensitized. This gives rise to a deterioration in the color reproducibility in multi-layered color light-sensitive materials. When a yellow filter layer is provided on a blue-sensitive layer in order to remove this defect, the blue light sensitivity is also reduced, although the sensitivity of the green region is reduced to some extent, and thus such is not preferred.

Also, of the monomethine cyanine dyes described in U.S. Pat. No. 3,752,670, German Patent Application (OLS) No. 2,303,204, etc., some dyes have the defect that the residual color is high, although they show a sharp J-band sensitization.

Therefore, an improved photographic emulsion in which the spectrally sensitized region in the blue region is sharply cut on the longer wavelength side and which gives rise to less dye stain in the processed photographic element is required.

SUMMARY OF THE INVENTION

An object of the present invention is to obtain a silver halide photographic emulsion which has a spectral sensitivity property in which the spectrally sensitized region is sharply cut on the longer wavelength side and which is spectrally sensitized in the blue region.

Another object of the present invention is to provide a silver halide photographic emulsion which gives rise to less dye stain in the processed photographic element and which is spectrally sensitized by a combination of dyes having a supersensitizing action.

A further object of the present invention is to provide a highly sensitive multi-layered color light-sensitive material having good color reproducibility which contains a blue sensitive layer causing less overlap with the spectral sensitivity of a green-sensitive layer and comprising a photographic emulsion highly spectrally sensitized in the blue light region.

Still a further object of the present invention is to provide a silver halide photographic emulsion sensitized by a combination of dyes having a supersensitizing action, which does not undergo a reduction in spectral sensitivity during dissolution of the emulsion, upon storage of the emulsion or during storage of the light-sensitive materials before processing, even in the co-presence of an anionic compound (particularly, a gelatinaggregating agent) or a color coupler.

The above-described objects of the present invention are attained by a silver halide photographic emulsion containing, in sufficient amounts to cause supersensitization, at least one sensitizing dye represented by the general formula (I)

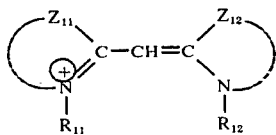 (I)

wherein $Z_{11}$ represents the atoms necessary to complete a thiazole nucleus, a selenazole nucleus, a benzothiazole nucleus, a benzoselenazole nucleus, a naphthothiazole nucleus or a naphthoselenazole nucleus; $Z_{12}$ represents the atoms necessary to complete a naphthothiazole nucleus, or a naphthoselenazole nucleus; and $R_{11}$ and $R_{12}$ each represents an aliphatic group with at least one of $R_{11}$ and $R_{12}$ having a carboxy or sulfo group; and at least one sensitizing dye represented by the general formula (II)

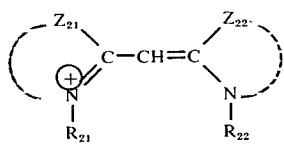 (II)

wherein $Z_{21}$ represents the atoms necessary to complete a thiazole nucleus, a benzothiazole nucleus, naphthothiazole nucleus, a selenazole nucleus, a benzoselenazole nucleus or a naphthoselenazole nucleus; $Z_{22}$ represents the atoms necessary to complete an imidazole nucleus, a benzimidazole nucleus or a naphthoimidazole nucleus; and $R_{21}$ and $R_{22}$ each represents an aliphatic group with at least one of $R_{21}$ and $R_{22}$ having a carboxy or sulfo group.

BRIEF DESCRIPTION OF THE DRAWING

The FIGURE shows the spectral percent transmission of the filter, SC-46 (made by Fuji Photo Film Co., Ltd.), used in Example 1.

DETAILED DESCRIPTION OF THE INVENTION

In the above general formula (I), $Z_{11}$ represents the atoms necessary to complete a thiazole nucleus, a selenazole nucleus, a benzothiazole nucleus, a benzoselenazole nucleus, a naphthothiazole nucleus or a naphthoselenazole nucleus; $Z_{12}$ represents the atoms necessary to complete a naphthothiazole or naphthoselenazole nucleus. These nuclei can be substituted with one or more substituents in positions other than at the nitrogen atom. For example, suitable substituents include one or more of a halogen atom (e.g., chlorine, bromine, fluorine, etc.), an alkyl group having up to 4 carbon atoms (e.g., a methyl group, an ethyl group, a butyl group, an ispropyl group, a sec-butyl group, etc.), an alkoxy group having up to 4 carbon atoms (e.g., a methoxy group, an ethoxy group, a propoxy group, an isobutoxy group, etc.), a hydroxy group, a carboxy group, an alkoxycarbonyl group having up to 4 carbon atoms (e.g., a methoxycarbonyl group, an ethoxycarbonyl group, etc.), a substituted alkyl group (e.g., a trifluoromethyl group, a benzyl group, a phenethyl group, an α-methylphenethyl group, etc.), an aryl group (e.g., a phenyl group, etc.), a substituted aryl group (e.g., a p-tolyl group, a 2,3-xylyl group, an m-cumenyl group, a p-ethylphenyl group, etc.), etc.

Specific examples of heterocyclic nuclei completed by $Z_{11}$ or $Z_{12}$ are: thiazole, 4-methylthiazole, 4,5-dimethylthiazol, 4-phenylthiazole, 4-(p-tolyl)thiazole, benzothiazole, 4-chlorobenzothiazole, 5-chlorobenzothiazole, 6-chlorobenzothiazole, 7-chlorobenzothiazole, 5-bromobenzothiazole, 6-bromobenzothiazole, 5-iodobenzothiazole, 5-fluorobenzothiazole, 4-methylbenzothiazole, 5-methylbenzothiazole, 6-methylbenzothiazole, 5,6-dimethylbenzothiazole, 5-methoxybenzothiazole, 6-methoxybenzothiazole, 5-ethoxybenzothiazole, 5-hydroxy-6-methylbenzothiazole, 5-carboxybenzothiazole, 5-ethoxycarbonylbenzothiazole, 5-trifluoromethylbenzothiazole, 5-phenylbenzothiazole, 4-phenylbenzothiazole, 5-phenethylbenzothiazole, benzoselenazole, 5-chlorobenzoselenazole, 5-methylbenzoselenazole, 5-hydroxybenzoselenazole, 5-methoxybenzoselenazole, naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,3-d]thiazole, 8-chloronaphtho[1,2-d]thiazole, naphtho[1,2-d]selenazole, naphtho[2,1-d]selenazole, 8-chloronaphtho[1,2-d]selenazole, and like nuclei.

$R_{11}$ and $R_{12}$ each represents an aliphatic group having up to 8 carbon atoms (including a saturated and unsaturated aliphatic hydrocarbyl group, in which the carbon chain thereof may be interrupted by a hetero atom such as oxygen, sulfur, nitrogen or the like). Examples of situations wherein $R_{11}$ or $R_{12}$ is interrupted by a hetero atom are sulfoalkoxyalkyl (e.g., 3-sulfopropyloxyethyl, 3-methoxy-2-(3-sulfopropoxy)propyl, etc.), sulfoalkylthioalkyl (e.g., 3-sulfopropylthioethyl, etc.), sulfoalkoxyalkoxyalkyl (e.g., 2-[2-(3-sulfopropoxy)ethoxy]ethyl, etc.), carboxyalkoxyalkyl (e.g., 2-(2-carboxyethoxy)ethyl, etc.). The aliphatic group may be substituted with one or more substituents such as a hydroxyl group, an alkoxy group (for example, a methoxy group or an ethoxy group), an alkylcarbonyloxy group (for example, such as an acetoxy group and a propionyloxy group), a phenyl group, a substituted phenyl group (for example, a sulfophenyl group and a chlorophenyl group), a carboxy group or a sulfo group, provided that at least one of $R_{11}$ and $R_{12}$ contains a carboxy or sulfo group. When both $R_{11}$ and $R_{12}$ possess a carboxy or sulfo group, one of $R_{11}$ or $R_{12}$ may form a salt with a cation such as an alkali metal ion (e.g., sodium, potassium, etc.), an ammonium ion or an organic base such as pyridine, trimethylamine, morpholine, etc., or an onium ion, etc. When the aliphatic group is substituted, the term "up to 8 carbon atoms" refers to the total carbon atoms in the substituent and the aliphatic group moiety. Thus, when the substituent is, for example, phenyl, the maximum number of carbon atoms in the aliphatic moiety is 2.

Of the substituted or unsubstituted aliphatic groups with or without a hetero atom represented by $R_{11}$ or $R_{12}$, specific examples not containing a carboxy or sulfo group include alkyl groups, for example, unsubstituted alkyl groups such as a methyl group, an ethyl group, a propyl group, a butyl group, a pentyl group, a hexyl group, an octyl group, an allyl group, an isobutyl group, an isohexyl group, a sec-butyl group, etc., hydroxyalkyl groups such as 2-hydroxyethyl group, a 4-hydroxybutyl group, etc., acyloxyalkyl groups such as a 2-acetoxyethyl group, a 3-acetoxypropyl group, etc., alkoxyalkyl groups such as a 2-methoxyethyl group, a 4-methoxybutyl group, etc., and the like.

Specific examples of such groups for $R_{11}$ or $R_{12}$ containing a carboxy or sulfo group include carboxyalkyl groups such as a 2-carboxyethyl group, a 3-carboxypropyl group, a 2-(2-carboxyethoxy)ethyl group, etc., and sulfoalkyl groups such as a 2-sulfoethyl group, a 3-sulfopropyl group, 3-sulfobutyl group, a 4-sulfobutyl group, a 2-hydroxy-3-sulfopropyl group, a 2-(3-sulfopropoxy)ethyl group, a 2-acetoxy-3-sulfopropyl group, a 3-methoxy-2-(3-sulfopropoxy)propyl group, a 2-[2-(3-sulfopropoxy)ethoxy]ethyl group, a 2-hydroxy-3-(3'-sulfopropoxy)-propyl group, etc. A p-carboxybenzyl group, a p-sulfobenzyl group or a p-sulfophenethyl group can also be used as $R_{11}$ or $R_{12}$.

In the above general formula (II), $Z_{21}$ represents the atoms necessary to complete a thiazole nucleus, a benzothiazole nucleus, a naphthothiazole nucleus, a selenazole nucleus, a benzoselenazole nucleus or a naphthoselenazole nucleus; $Z_{22}$ represents the atoms necessary to complete an imidazole nucleus, a benzimidazole nucleus or a naphthoimidazole nucleus. These nuclei can be substituted with one or more substituents other than $R_{21}$ and $R_{22}$ in positions other than at the nitrogen atoms, for example, they can be substituted with a halogen atom (e.g., chlorine, bromine, fluorine, etc.), an alkyl group having up to 4 carbon atoms (e.g., a methyl group, an ethyl group, a butyl group, an isopropyl group, a sec-butyl group, etc.), an alkoxy group having up to 4 carbon atoms (e.g., a methoxy group, an ethoxy group, a propoxy group, an isobutoxy group, etc.), a hydroxy group, a carboxy group, an alkoxycarbonyl group having up to 4 carbon atoms (e.g., a methoxycarbonyl group, an ethoxycarbonyl group, a butoxycarbonyl group, etc.), a substituted alkyl group (e.g., a trifluoromethyl group, a benzyl group, a phenethyl group, an α-methylphenethyl group, etc.), an aryl group (e.g., phenyl group, etc.), a substituted aryl group (e.g., a p-tolyl group, a 2,3-xylyl group, an m-cumenyl group, a p-ethylphenyl group, etc.), an alkylsulfonyl group having up to 4 carbon atoms (e.g., a methylsulfonyl group, an ethylsulfonyl group, a propylsulfonyl group, etc.), etc.

$R_{21}$ and $R_{22}$ are the same as defined with $R_{11}$ and $R_{12}$, and at least one of $R_{21}$ and $R_{22}$ represents an aliphatic group containing either a carboxy group or a sulfo group.

Specific examples of heterocyclic nuclei completed by $Z_{21}$ are: thiazole, 4-methylthiazole, 4,5-dimethylthiazole, 4-phenylthiazole, 4-(p-tolyl)thiazole, benzothiazole, 4-chlorobenzothiazole, 5-chlorobenzothiazole, 6-chlorobenzothiazole, 7-chlorobenzothiazole, 5-bromobenzothiazole, 6-bromobenzothiazole, 5-iodobenzothiazole, 5-fluorobenzothiazole, 4-methylbenzothiazole, 5-methylbenzothiazole, 6-methylbenzothiazole, 5,6-dimethylbenzothiazole, 5-methoxybenzothiazole, 6-methoxybenzothiazole, 5-ethoxybenzothiazole, 5-hydroxy-6-methylbenzothiazole, 5-carboxybenzothiazole, 5-ethoxycarbonylbenzothiazole, 5-trifluoromethylbenzothiazole, 5-phenylbenzothiazole, 4-phenylbenzothiazole, 5-phenethylbenzothiazole, naphtho[1,2-d]thiazole, naphtho[2,1-d]thiazole, naphtho[2,3-d]thiazole, 5-methylnaphtho-[1,2-d]thiazole, 5-methylnaphtho[1,2-d]thiazole, 7-methylnaphtho-[1,2-d]thiazole, 7-ethylnaphtho[1,2-d]thiazole, 7-methylnaphtho-[2,1-d]naphthothiazole, 5-methoxynaphtho[1,2-d]thiazole, 7-ethoxynaphtho[2,1-d]thiazole, 8-methoxynaphtho[2,3-d]thiazole, 8-chloronaphtho[1,2-d]thiazole, selenazole, benzoselenazole, 5-chlorobenzoselenazole, 5-methylbenzoselenazole, 5-hydroxybenzoselenazole, 5-methoxybenzoselenazole, naphtho[1,2-d]selenazole, naphtho[2,1-d]selenazole, naphtho[2,3-d]selenazole, 8-chloronaphtho[1,2-d]selenazole, 7-methylnaphtho[1,2-d]-selenazole, etc.

Specific examples of heterocyclic nuclei completed by $Z_{22}$ are: imidazole, benzimidazole, 5-chlorobenzimidazole, 5,6-dichlorobenzimidazole, 5-methylsulfonylbenzimidazole, 5-acetylbenzimidazole, 5-cyanobenzimidazole, 5-carboxybenzimidazole, 5-ethoxycarbonylbenzimidazole, 5-butoxycarbonylbenzimidazole, naphtho[1,2-d]imidazole, naphtho[2,1-d]imidazole, naphtho[2,3-d]-imidazole, etc.

In the present invention, particularly useful dyes of the general formula (I) are the dyes represented by the following general formula (III)

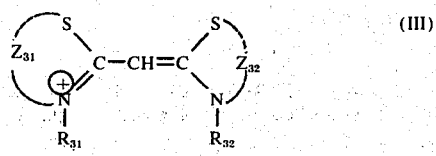

wherein $Z_{31}$ represents the atoms necessary to complete a benzothiazole nucleus or a naphthothiazole nucleus as described hereinbefore for $Z_{11}$, $Z_{32}$ represents the atoms necessary to complete a naphthothiazole nucleus as described hereinbefore for $Z_{12}$. These nuclei can be substituted with one or more substituents in addition to $R_{31}$ and $R_{32}$ on the nitrogen atoms. Examples of such substituents are the same as described in the general formula (I). $R_{31}$ represents an $-A_{31}-SO_3H$ group or an $-A_{31}-COOH$ group, wherein $A_{31}$ represents an alkylene group having up to 4 carbon atoms which may be substituted with a hydroxy group (e.g., a methylene group, an ethylene group, a trimethylene group, a tetramethylene group, a propylene group, a 2-hydroxy-1,3-butylene group, etc.). $R_{32}$ represents an alkyl group having up to 4 carbon atoms which may be substituted with a hydroxy group (e.g., a methyl group, an ethyl group, a propyl group, a butyl group, an isopropyl group, a 2-hydroxyethyl group, etc.) or represents an $-A_{32}-SO_3H$ group or an $-A_{32}-COOH$ group wherein $A_{32}$ is the same as defined with respect to $A_{31}$.

Of the sensitizing dyes represented by the general formula (III), those represented by the following general formula (V) are particularly useful wherein $Z_{51}$ represents the atoms necessary to complete a benzothiazole nucleus or a naphtho[1,2-d]thiazole nucleus which may be substituted with the same substituents as defined for the corresponding group in general formula (III); $R_{51}$ is the same as defined with respect to $R_{31}$; $R_{52}$ represents an alkyl group having up to 4 carbon atoms which may be substituted with a hydroxy group (e.g., a methyl group, an ethyl group, a butyl group, an isopropyl group, a 2-hydroxyethyl group, etc.); $Y_{52}$ represents a hydrogen atom or a halogen atom (e.g., a chlorine atom, a bromine atom, etc.).

In the present invention, particularly useful dyes represented by the general formula (II) are those represented by the following general formula (IV)

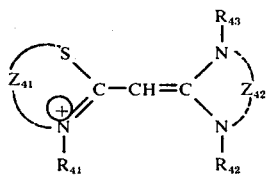

wherein $Z_{41}$ represents the atoms necessary to complete a naphthothiazole nucleus as hereinbefore described for $Z_{21}$; $Z_{42}$ represents the atoms necessary to complete a benzimidazole nucleus or a naphthoimidazole nucleus, both as hereinbefore described for $Z_{22}$. These nuclei can be substituted with one or more substituents in addition to $R_{41}$, $R_{42}$ and $R_{43}$ on the nitrogen atoms. Examples of such substituents are the same as described with respect to the general formula (II). $R_{41}$ represents an alkyl group having up to 4 carbon atoms which may be substituted with a hydroxy group (e.g., a methyl group, an ethyl group, a propyl group, a butyl group, an isopropyl group, a 2-hydroxyethyl group, etc.), or represents an —$A_{41}$—$SO_3H$ group or an —$A_{41}$—COOH group wherein $A_{41}$ represents an alkylene group having up to 4 carbon atoms which may be substituted with a hydroxy group (e.g., a methylene group, an ethylene group, a trimethylene group, a tetramethylene group, a propylene group, a 2-hydroxy-1,3-butylene group, etc.). $R_{42}$ represents an —$A_{42}$—$SO_3H$ group or an —$A_{42}$—COOH group wherein $A_{42}$ is the same as defined with respect to $A_{41}$. $R_{43}$ represents an alkyl group having up to 4 carbon atoms (e.g., a methyl group, an ethyl group, a propyl group, a butyl group, an isopropyl group, etc.) or a substituted alkyl group having up to 4 carbon atoms (e.g., a 2-hydroxyethyl group, a 4-hydroxybutyl group, a 2-acetoxyethyl group, a 3-acetoxypropyl group, a 2-methoxyethyl group, a 4-methoxybutyl group, etc.).

Of the sensitizing dyes represented by the general formula (IV), those represented by the following general formula (VI) are particularly useful

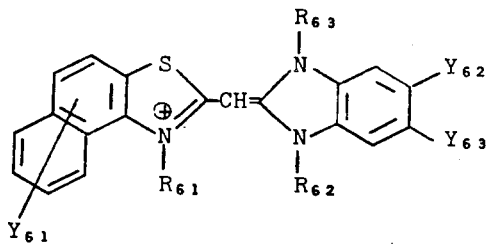

and

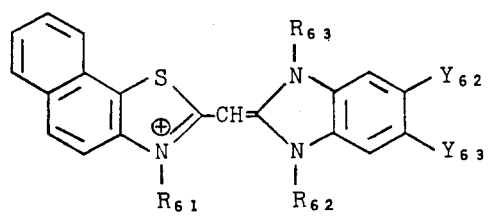

(VI)

wherein $R_{61}$ is the same as defined for $R_{41}$; $R_{62}$ is the same as defined for $R_{42}$; $R_{63}$ is the same as defined for $R_{43}$; $Y_{61}$ represents a hydrogen atom, an alkyl group having up to 4 carbon atoms (e.g., a methyl group, an ethyl group, a butyl group, an isopropyl group, etc.), or a halogen atom (e.g., a chlorine atom, a bromine atom, etc.); $Y_{62}$ represents a hydrogen atom or a halogen atom (e.g., a chlorine atom, a bromine atom, etc); $Y_{63}$ represents a hydrogen atom, a halogen atom (e.g., a chlorine atom, a bromine atom, etc.), an alkylsulfonyl group having up to 4 carbon atoms (e.g., a methylsulfonyl group, an ethylsulfonyl group, a propylsulfonyl group, etc.), or an alkoxycarbonyl group having up to 4 carbon atoms (e.g., a methoxycarbonyl group, an ethoxycarbonyl group, a butoxycarbonyl group, etc.).

Dyes represented by the general formulae (I) and (II) are individually known and those skilled in the art can easily synthesize the dyes by reference to U.S. Pat. Nos. 3,149,105, 2,238,231, British Pat. No. 742,112, F. M. Hamer, *The Cyanine Dyes and Related Compounds*, p. 55 et seq., (Interscience Publishers, New York, 1964) or, if the compounds are not described therein, in an analogous manner.

Typical examples of sensitizing dyes used in the present invention represented by the general formula (I) are illustrated below. However, the present invention is not to be construed as being limited to these sensitizing dyes.

I-1

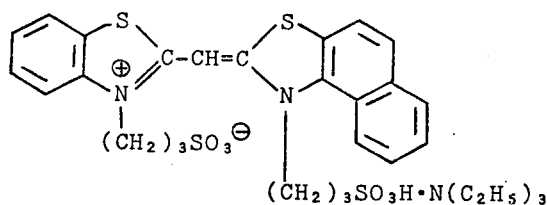

I-2

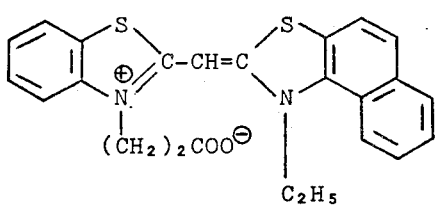

I-3

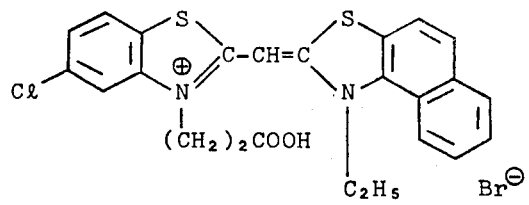

I-4

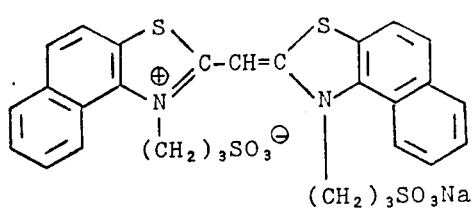

I-5 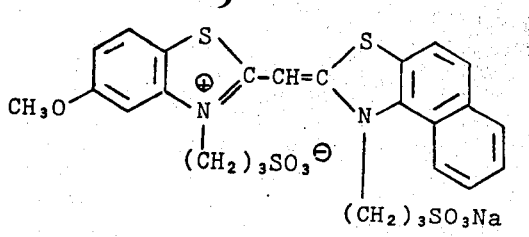
I-6 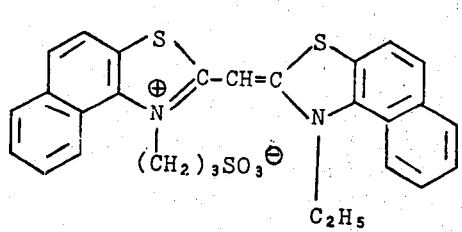
I-7 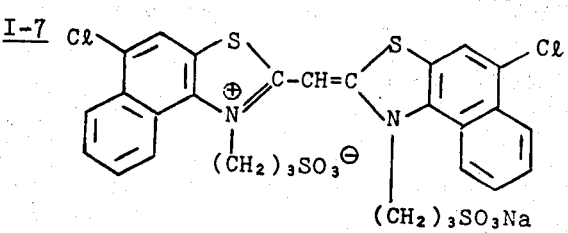
I-8 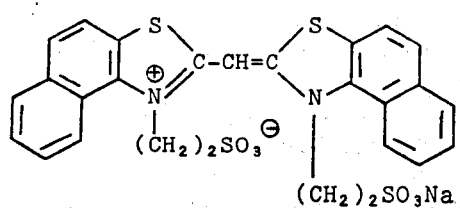
I-9 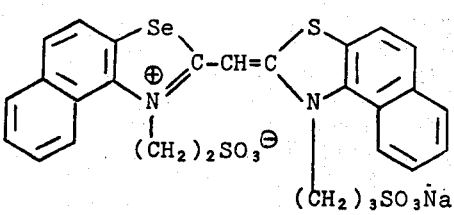
I-10 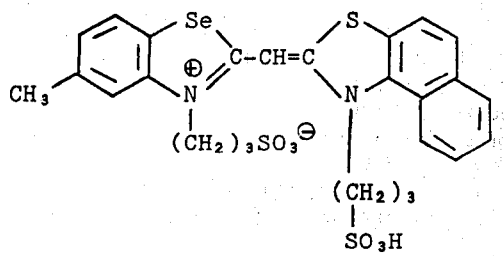
Typical examples of sensitizing dyes used in the present invention represented by the general formula (II) are illustrated below. However, the present invention is not to be construed as being limited to these sensitizing dyes.
II-1 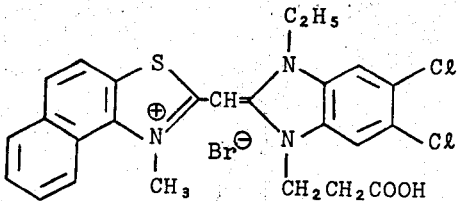
II-2 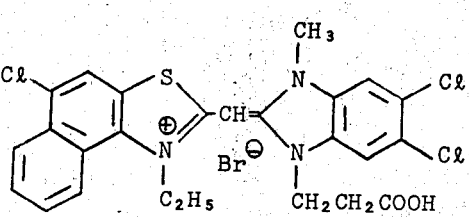
II-3 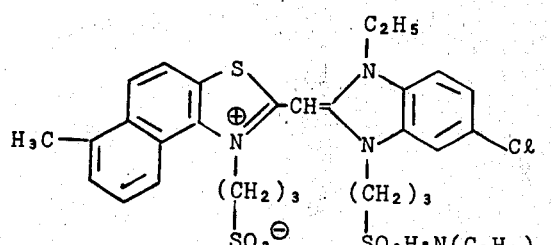
II-4 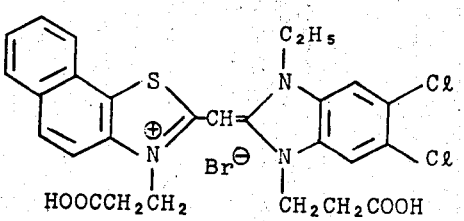
II-5 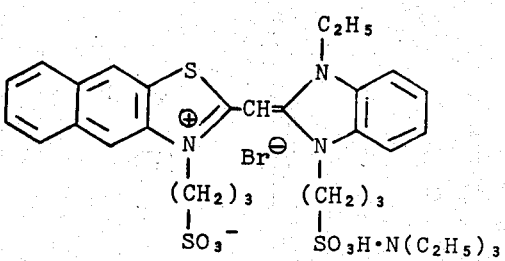

II-6

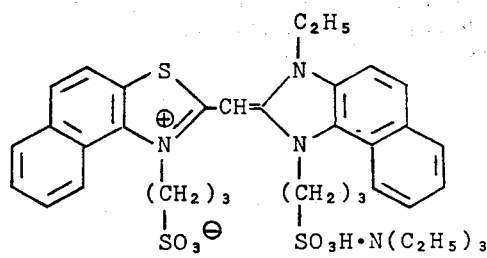

II-7

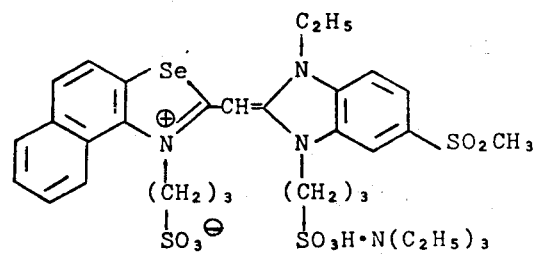

II-8

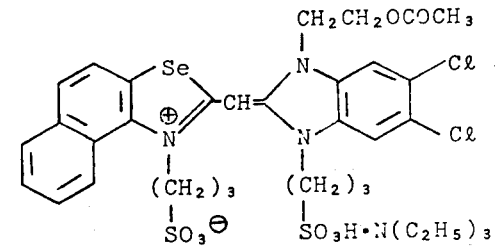

II-9

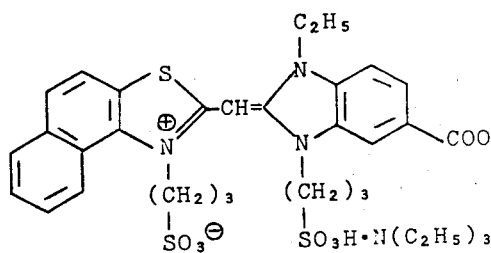

II-10

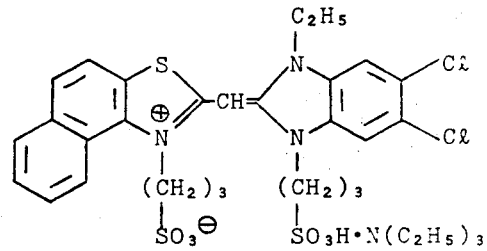

The amount of sensitizing dyes in the present invention for obtaining supersensitization is not particularly limited, but it is advantageous to use each of the dyes in an amount of from about $2 \times 10^{+6}$ mol to about $1 \times 10^{+3}$ mol, in particular, $5 \times 10^{+6}$ mol to $1 \times 10^{+4}$ mol, per mol of silver halide. The proportion of the dye represented by the general formula (I) to the dye represented by the general formula (II) which is advantageous for obtaining supersensitization ranges from about 20:1 to 1:20, in particular 5:1 to 1:5.

The photographic emulsion of the present invention can contain other sensitizing dyes than the dyes represented by the general formulae (I) and (II) or substantially colorless compounds which are known to possess a supersensitizing action within the scope and amount wherein the effect of the combination of the dyes of the present invention is not lost. For example, the photographic emulsion can contain pyrimidylamino group- or triazinylamino group-containing compounds described in U.S. Pat. Nos. 2,933,390, 3,511,664, 3,615,613, 3,615,632, 3,615,641, etc., the aromatic organic acid-formaldehyde condensates described in British Pat. No. 1,137,580, azaindenes or cadmium salts.

The light-sensitive material using the photographic emulsion of the present invention can contain at the same time a spectrally sensitized emulsion and/or a spectrally unsensitized emulsion layer other than the photographic emulsion of the present invention, and the position-wise relationship thereof in the light-sensitive material can be varied as desired.

Proceses known in the field of supersensitization can be employed for the addition of the sensitizing dyes to an emulsion.

These sensitizing dyes can be directly dispersed in an emulsion, or can be dissolved in a water-soluble solvent such as pyridine, methyl alcohol, ethyl alcohol, methyl Cellosolve, acetone (or a mixture of such solvents) and, in some cases, diluted with water or dissolved in water, and added to an emulsion as a solution. Also, ultrasonic wave vibration can be used for this dissolution. Further, as is described in U.S. Pat. No. 3,469,987, etc., a process of dissolving the dye in a volatile organic solvent, dispersing this solution in a hydrophilic colloid, and adding the resulting dispersion to an emulsion, or a process of dispersing a water-insoluble dye in a water-soluble solvent without dissolution and adding the resulting dispersion to an emulsion as described in Japanese Pat. Publication No. 24185/71 can be used. Also, the dyes can be added to an emulsion by dissolving the dye in an acid solution and dispersing the acid solution in the emulsion. In addition, the processes described in U.S. Pat. Nos. 2,912,345, 3,342,605, 2,996,287, 3,425,835, etc., can be used for the addition to an emulsion.

The process comprising dissolving the sensitizing dyes to be incorporated in combination in the present invention in the same or different solvents and mixing the solutions prior to the addition to a silver halide emulsion is preferably employed. However, if necessary, the sensitizing dyes may be individually dissolved in an appropriate solvent and separately added to an emulsion. The addition of these sensitizing dyes can be effected at any stage during the step of producing an emulsion, but advantageously is effected after the completion of the second ripening prior to the coating of the emulsion on a support.

The silver halide used for the emulsion of the present invention can be any of, for example, silver chloride, silver bromide, silver iodide, silver chlorobromide, silver bromoiodide, and silver chlorobromide. In particular, silver chlorobromide and silver chlorobromoiodide (particularly containing about 1.0 mol % or less silver iodide) are advantageously used.

As a vehicle for the silver halide emulsion of the present invention, gelatin is usually used. However, gelatin can be replaced, partly or completely, by a substance which does not detrimentally influence the light-sensitive silver halide such as a gelatin derivative, albumin, agar-agar, gum arabic, alginic acid, a hydrophilic synthetic resin (e.g., polyvinyl alcohol, polyvinyl pyrrolidone, etc.), a cellulose derivative, etc.

These silver halide emulsions can be coarse grained or fine grained or be a mixture of coarse and fine grains. The silver halide grains can be formed using a known process, e.g., a single jet process, a double jet process or a controlled double jet process.

Also, the crystal structure of the silver halide grains can be uniform throughout the grain or can have a stratum structure wherein the inside and the outside are different from each other, or can be a so-called conversion type silver halide grain as described in British Pat. No. 635,841 and U.S. Pat. No. 3,622,318. Also, either grains of the type which form a latent image mainly on the surface thereof or grains of an internal latent image type which form a latent image within the grains can be used. These photographic emulsions are described in C. E. K. Mees, & T. H. James, *The Theory of the Photographic Process*, 3rd Ed., Macmillan Co., New York (1966), P. Glafkides, *Photographic chemistry*, Fountain Press, (1957), etc., and can be prepared according to various processes commonly employed, such as an ammoniacal process, a nautral process, an acidic process, etc.

The mean grain size of the silver halide to be used (measured by, e.g., the projected area method, the numerical average method, etc.) is not particularly limited, but a mean grain size of from about 0.04 μm to about 2 μm is preferred. The grain size distribution (grain size beig used in the above-described sense) can be either narrow or broad.

The silver halide emulsion can be an emulsion which is physically ripened or physically unripened. Usually, the soluble salts are removed from the emulsion after the formation of precipitates or after physical ripening. Removal of the soluble salts can be by a noodle-washing process or a flocculation process using an inorganic salt containing a multivalent anion (e.g., ammonium sulfate, etc.), an anionic surface active agent, polystyrene-sulfonic acid, other anionic polymers, an aliphatic or aromatic acylated gelatin or like gelatin derivatives.

The silver halide emulsion can be a chemically unsensitized emulsion (the so-called non-ripened emulsion), but a chemically sensitized emulsion can also be used. Suitable chemical sensitization processes which can be used are described in Mees and James, supra, Glafkides, supra, or H. Fieser, *Die Gründlagen der Photographischen Prozesse mit Silberhalogeniden*, Akademische Verlagsgesellschaft (1968), and other various known processes can be used. That is, chemical sensitization techniques which can be used include sulfur sensitization using a sulfur-containing compound capable of reacting with silver ion, such as thiosulfate or the compounds described in U.S. Pat. Nos. 1,574,944, 2,278,947, 2,410,689, 3,189,458, 3,501,313, French Patent 2,059,245, etc., or an active gelatin; reduction sensitization using a reducing substance such as stannous salts described in U.S. Pat. No. 2,487,850, amines described in U.S. Pat. Nos. 2,518,698, 2,521,925, 2,521,926, 2,419,973, 2,419,975, iminoaminomethanesulfinic acid described in U.S. Pat. No. 2,983,610, silane compunds described in U.S. Pat. No. 2,694,637, or according to the process described in H. W. Wood, *Journal of Photographic Science*, Vol. 1, p. 163 et seq., (1953); gold sensitization using a gold complex salt described in U.S. Pat. No. 2,399,083, gold-thiosulfuric acid complex salt, etc.; sensitization using salts of noble metals such as platinum, palladium iridium, rhodium, ruthenium, etc., individually or in combination as described in U.S. Pat. Nos. 2,448,060, 2,540,086, 2,556,245, and 2,566,263. Also, selenium sensitization described in U.S. Pat. No. 3,297,446 can be used in place of or in combination with the sulfur sensitization.

The photographic emulsion of the present invention can contain various compounds in order to prevent fogging during their production, during storage of the light-sensitive material or upon development-processing or to stabilize the photographic properties. That is, azoles such as benzotriazole, benzothiazolium salt described in U.S. Pat. No. 2,131,038, aminobenzimidazole described in U.S. Pat. No. 2,324,123, etc.; nitroazoles such as nitroindazole, nitrobenzotriazole, nitrobenzimidazole described in British Pat. No. 403,789, nitroaminobenzimidazole described in U.S. Pat. No. 2,324,123, etc.; halogen-substituted azoles such as 5-chlorobenzimidazole, 5-bromoimidazole, 6-chlorobenzimidazole, etc.; mercaptoazoles such as mercaptothiazole derivatives described in U.S. Pat. No. 2,824,001, mercaptobenzothiazole, derivatives thereof described in U.S. Pat. No. 2,697,099, mercaptoimidazole derivatives described in U.S. Pat. No. 3,252,799, mercaptobenzimidazole, mercaptooxadiazole described in U.S. Pat. No. 2,843,491, mercaptothiadiazole described in U.S. Pat. No. 1,758,576, phenylmercaptotetrazole described in U.S. Pat. No. 2,403,927; mercaptopyrimidine described in U.S. Pat. No. 2,304,962; mercaptotriazine described in U.S. Pat. No. 2,476,536; mercaptotetrazaindene described in U.S. Pat. No. 3,226,231; thiosalicylic acid described in U.S. Pat. No. 2,377,375, thiobenzoic acid described in U.S. Pat. No. 3,226,231, sugar mercaptals described in Japanese Pat. Publication No. 8743/72, and other various mercapto compounds; oxazolinethione described in U.S. Pat. No. 3,251,691, triazolothiadiazole described in Japanese Pat. Publication No. 17932/68, and the like can be added to the emulsion. Also, azaindene compounds such as tetrazaindenes; compounds described in, e.g., U.S. Pat. Nos. 2,444,605, 2,444,606, 2,450,397, Japanese Pat. Publication Nos. 10166/64, 10516/67, etc.; pentazaindenes; compounds described in, e.g., U.S. Pat. No. 2,713,541, Japanese Pat. Publication No. 13495/68; urazols described in U.S. Pat. No. 2,708,161; and like nitrogen-containing hetero ring compounds having anti-fogging action can be incorporated into the emulsion. In addition, benzenesulfinic acid described in U.S. Pat. No. 2,394,198, benzenethiosulfonic acid, and benzenesulfinic acid amide described in Japanese Pat. Publication No. 4136/68, can be added to the emulsion. Further, various chelating agents to prevent fogging due to metal ions, such as those described in British Pat. No. 623,488, Japanese Patent Publication Nos. 4941/68 and 13496/68 can be employed in the emulsion.

For the purpose of increasing the sensitivity and enhancing the contrast or accelerating development, the photographic emulsion of the present invention can contain polyalkylene oxide derivatives described in U.S. Pat. No. 2,441,389, polyalkylene oxide ethers, esters and amides described in U.S. Pat. No. 2,708,161, polyalkylene oxide derivatives described in British Pat. No. 1,145,186, Japanese Patent Publication Nos. 10989/70, 15188/70, 43435/71, 8106/72 and 8742/72, thioether compounds described in U.S. Pat. Nos. 3,046,132 to 3,046,135, Japanese Patent Publication Nos. 9019/70 and 11119/72, thiomorpholines described in Japanese Patent Publication No. 28325/72, quaternary ammonium compounds described in U.S. Pat. No. 3,772,021, pyrrolidine compounds described in Japanese Pat. Publication No. 27037/70, alkoxycarbonylamino, aryloxycarbonylamino, or urea derivatives described in Japanese Pat. Publication No. 23465/65, imidazole derivatives described in Japanese Pat. Publication No. 45541/72, polymers described in Japanese Pat. Publication No. 26471/70, 3-pyrazolidones described in Japanese Pat. Publication No. 27670/70, and the like.

Inorganic or organic mercury compounds can be added to the photographic emulsion of the present invention in order to sensitize or prevent fogging. For example, mercury complex compounds described in U.S. Pat. No. 2,728,664, benzothiazole mercury salts described in U.S. Pat. No. 2,728,667, mercury salt adducts described in U.S. Pat. No. 2,728,663, and 2,732,302, organic mercury compounds described in U.S. Pat. Nos. 2,728,665 and 3,420,668, and the like can be used.

Additives having various functions for enhancing the quality of the photographic light-sensitive materials, such as a hardener, a coating aid, a plasticizer, an emulsion polymerization latex, an antistatic agent, an ultrasiolet light-absorbing agent, an anti-oxidant, etc., can be incorporated into the photographic emulsion of the present invention.

The photographic emulsion of the present invention can be hardened using a commonly used hardener. Examples of hardeners which can be used, alone or in combination, include aldehydes such as glyoxal described in U.S. pat. No. 1,870,354, glutaraldehyde described in British Pat. No. 825,544, etc.; N-methylol compounds such as N,N'-dimethylol urea, dimethylolhydantion described in British pat. No. 676,628, etc.; dioxane derivatives such as dihydroxydioxane described in U.S. Pat. No. 3,380,829, the derivative thereof described in Japanese Pat. Publication No. 38713/71; epoxy group-containing compounds such as those described in U.S. Pat. Nos. 3,047,394, 3,091,537 and Japanese Pat. Publication No. 7133/59; reactive halogen-containing compounds such as 2,4-dichloro-6-hydroxy-1,3,5-triazine described in U.S. Pat. No. 3,325,287, mucohalogenic acids such as mucochloric acid and mucobromic acid described in U.S. Pat. No. 2,080,019, the derivatives thereof described in Japanese Pat. Publication No. 1872/71; bis(methanesulfonic acid ester) described in U.S. Pat. No. 2,726,162; sulfonyl compounds such as bis(benzenesulfonyl chloride) described in U.S. Pat. No. 2,725,295; aziridine compounds such as those described in Japanese Pat. Publication Nos. 4212/58 and 8790/62; divinylsulfones such as those described in U.S. Pat. No. 2,579,871, etc.; reactive olefin bond-containing compounds such as divinyl ketones of the type described in German Pat. No. 872,153, acryloyl group-containing compounds described in U.S. Pat. Nos. 3,255,000, 3,635,718, British Pat. No. 994,869, West German Pat. No. 1,090,427, etc., alkylenebismaleimides described in U.S. Pat. Nos. 2,992,109, etc.; isocyanates described in U.S. Pat. No. 3,103,427, etc.; carbodiimides described in U.S. Pat. No. 3,100,704, etc.; isoxazole derivatives such as those described in U.S. Pat. Nos. 3,321,313 and 3,543,292; chlorocarbamoyl derivatives described in Japanese Pat. Publication No. 6899/66, etc.; high molecular weight hardeners such as aldehyde starch described in U.S. Pat. No. 3,057,723, compounds described in Japanese Pat. Publication No. 12550/67, etc.; inorganic hardeners such as chromium alum, chromium acetate, zirconium sulfate, and the like.

Various known surface active agents can be added to the photographic emulsion of the pesent invention as a coating aid or for improving the antistatic properties, lubrication, and the like. For example, nonionic surface active agents such as saponin, polyethylene glycol, polyethylene glycol-polypropylene glycol condensates described in U.S. Pat. No. 3,294,540, alkylene glycol ethers described in U.S. Pat. Nos. 2,240,472 and 2,831,766, polyalkylene glycol esters, polyalkylene glycol amides, etc.; anionic surface active agents such as alkylcarboxylates, alkylsulfonates, alkylbenzenesulfonates, alkylnaphthalenesulfonates, alkylsulfates, N-acylated N-alkyltaurines described in U.S. pat. No. 2,739,891 maleopimelates described in U.S. Pat. Nos. 2,359,980, 2,409.930 and 2,447,750, compounds described in U.S. Pat. Nos. 2,823,123 and 3,415,649, etc.; and amphoteric surface active agents such as the compounds described in British Pat. No. 1,159,825, Japanese Pat. Publication No. 378/65, Japanese Pat. Application (OPI) No. 43924/73, U.S. Pat. No. 3,726,683, etc., can be employed.

A plasticizer such as glycerin and diols described in U.S. Pat. No. 2,960,404 and trihydric aliphatic alcohols described in U.S. Pat. No. 3,520,694 can be incorporated in the photographic emulsion of the present invention.

The photographic emulsion of the present invention can contain, for the purpose of improving dimensional stability, a water-insoluble or slightly water-soluble synthetic polymer dispersion. For example, polymers containing as a monomer component alkyl acrylates, alkyl methacrylates, alkoxy acrylates, alkoxymethacrylates, glycidyl acrylate, glycidyl methacrylate, acrylamide, methacrylamide, vinyl acetate, acrylonitrile, olefins, styrene, etc., individually or in combination, or as a combination thereof with acrylic acid, $\alpha,\beta$-unsaturated dicarboxylic acids, sulfoalkyl acrylates, styrenesulfonic acid, etc., can be used. Specific examples include the polymers described in U.S. Pat. Nos. 2,376,005, 3,607,290, 3,645,740, British Pat. Nos. 1,186,699, and 1,307,373 U.S. Pat. Nos. 3,062,674, 2,739,137, 3,411,911, 3,488,708, 3,635,715, and 2,853,457.

Irradiation-preventing agents which can be incorporated according to the end-use thereof include, e.g., those described in Japanese Pat. Publication Nos. 20389/66, 3504/68, 13168/68, U.S. Pat. Nos. 2,697,037, 3,423,207, 2,865,752, British Patents 1,030,392, 1,100,546, etc.

The photographic emulsion of the present invention can contain commonly used non-diffusible, color image-forming couplers. The color image-forming couplers are those compounds capable of reacting with an oxidation product of an aromatic primary amine developing agent upon photographic development (hereinafter abbreviated as "coupler"). The couplers can be a 4-equivalent type coupler or a 2-equivalent type coupler, and can be a colored coupler for color correction or a development inhibitor-releasing coupler. Open-chain ketomethylene type compounds such as the acylaminoacetamides series are used as yellow-forming couplers. Compounds of the pyrazolone series or the cyanoacetyl series are used as magenta-forming couplers and naphtholic or phenolic couplers are used as cyan-forming couplers. The couplers can be incorporated into the photographic emulsion layers using a process commonly employed for multicolor light-sensitive materials.

Examples of 4-equivalent type or 2-equivalent type diketomethylene yellow couplers which can be used include the compounds described in U.S. Pat. Nos. 3,277,157, 3,415,652, 3,447,928, 3,311,476, 3,408,194, etc., the compounds described in U.S. Pat. Nos. 2,875,057, 3,265,506, 3,409,439, 3,551,155 and 3,551,156, West German Pat. Application (OLS) Nos. 1,956,281, 2,162,899, etc., and the compounds described in Japanese Pat. Application (OPI) Nos. 26133/72, 66836/73, etc.; of 4-equivalent or 2-equivalent type pyazolone magenta couplers of indazolone magenta couplers include the compounds as described in U.S. Pat. Nos. 2,600,788, 2,983,608, 3,006,759, 3,062,653, 3,214,437, 3,253,924, 3,419,391, 3,419,808, 3,476,560, 3,582,322, Japanese Pat. Publication No. 20636/70, Japanese Pat. Application (OPI) No. 26133/72, etc.; of α-naphtholic cyan couplers or phenolic cyan couplers include the compounds described in U.S. Pat. Nos. 2,474,293, 2,698,794, 3,034,892, 3,214,437, 3,253,924, 3,311,476, 3,458,315, 3,591,383, Japanese Pat. Publication Nos. 11304/67, 32461/69, etc. In addition, the DIR couplers or the DIR compounds described in U.S. Pat. Nos. 3,227,554, 3,148,062, 3,297,445, 3,253,924, 3,311,476, 3,379,529, 3,516,831, 3,617,291, 3,705,801, 3,632,345, West German Pat. Application (OLS) No. 2,163,811, etc., can be used.

The present invention can be applied to a multi-layered multi-color photographic material comprising a support having thereon at least two emulsion layers having different spectral sensitivities. Multi-layer natural color photographic materials usually comprise a support having thereon at least one red-sensitive silver halide emulsion layer, one green-sensitive silver halide emulsion layer and one blue-sensitive silver halide emulsion layer. The sequence of these layers can be optionally selected depending on the end-use requirements. Usually, a cyan-forming coupler is associated with a red-sensitive silver halide emulsion layer, a magnenta-forming coupler with a green-sensitive silver halide emulsion layer and a yellow-forming coupler with a blue-sensitive silver halide emulsion layer but, in some cases, other combinations can be employed.

The photographic emulsion of the present invention can contain a developing agent such as aromatic diols (e.g., hydroquinone, etc.), aminophenols, phenyleneidamines, 3-pyrazolidones, ascorbic acid or a derivative thereof, individually or in combination. The combination of the hydroquinone described in Japanese Pat. Publication No. 43814/73 and an N-hydroxyalkyl-substituted p-aminophenol derivative is particularly advantageous. Water-insoluble developing agents can be added as a dispersion, e.g., as described in U.S. Pat. No. 2,592,368 and French Pat. No. 1,505,778.

The photographic emulsion of the present invention can be coated, separately or together with other hydrophilic layers, on a support using various known coating processes. Suitable coating processes include dip-coating, air-knife coating, roller-coating, curtain coating and extrusion coating. The process described in U.S. Pat. No. 2,681,294 is an advantageous process. Also, two or more layers can be coated at the same time using the process as described in U.S. Pat. Nos. 2,761,791, 3,526,528, etc.

Suitable supports include any of those which are transparent or opaque and are commonly used for photographic emulsions, such as a glass plate, a film comprising a synthetic high polymer such as a polyalkyl acrylate, a polyalkyl methacrylate, polystyrene, polyvinyl chloride, partially formalated polyvinyl alcohol, polycarbonate, a polyester (e.g., polyethylene terephthalate, etc.), a polyamide, etc.; a film comprising a cellulose derivative such as cellulose acetate, cellulose nitrate, cellulose acetate butyrate, etc.; paper, baryta-coated paper, α-olefin polymer-coated paper; synthetic papers comprising polystyrene or the like; ceramics, metal, and the like.

For the photographic processing of the photographic emulsion of the present invention, any known processing procedure employing known processing solutions can be used. The processing temperature can be lower than about 18° C, about 18° C to about 50° C, or higher than about 50° C.

A silver image-forming development (black-and-white photographic processing) or a color photographic processing comprising a development-procesing for forming dye images can be applied to the light-sensitive material of the present invention.

Suitable developing agents which can be used include 4-aminophenols represented by N-methyl-4-aminophenol hemisulfate (popularly called "Metol"), N-benzyl-4-aminophenol hydrochloride, N,N-diethyl-4-aminophenyl hydrochloride, 4-aminophenol sulfate, etc.; 3-pyrazolidones such as 1-phenyl-3-pyrazolidone, 4,4-dimethyl-1-phenyl-3-pyrazolidone, 4-methyl-1-phenyl-3-pyrazolidone, etc.; polyhydroxybenzenes such as hydroquinone, 2-methylhydroquinone, 2-phenylhydroquinone, 2-chlorohydroquinone, pyrogallol, catechol, etc.; p-phenylenediamines such as p-phenylenediamine sulfate, etc.; ascobic acid; N-(p-hydroxyphenyl)glycine; and the compounds described in C. E. K. Mees and T. H. James, *The Theory of the Photographic Process*, 3rd Ed., Chapter 13, Macmillan Co., New York (1966), and L. F. A. Mason, *Photographic Processing Chemistry*, pp. 16 – 30, Focal Press, London, (1966), individually or in suitable combination.

Dye images can be obtained by subjecting the silver halide photographic emulsion of the invention to color development processing.

Color development processing fundamentally involves a color development step, a bleaching step and a fixing step. In this case, two or more steps can be combined by using a processing solution having functions permitting the steps to be conducted as one step (e.g., a combined bleach-fixing solution, etc.). The processing temperature is selected within preferred ranges depending on the light-sensitive materials employed and processing solution composition employed. In some cases, temperatures lower than about 18° C can be employed. However, in many cases, temperatures of about 18° C or above are used. Temperatures particularly employed range from about 20° C to 60° C, recently from about 30° C to 60° C.

The color developer is an alkaline aqueous solution of a pH of about 8 or above, preferably 9 to 12, containing a compound, i.e., a developing agent, whose oxidation product can react with a coloring agent, called a coupler, to form a colored product. The above-described developing agent is a compound having a primary amino group on an aromatic ring and having the ability of developing exposed silver halide, or is a precursor thereof capable of forming such a compound. For example, typical examples of developing agents include 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethylaniline, 4-amino-3-methyl-N-ethyl-N-β-methanesulfonamidoethylaniline, 4-amino-N,N-dimethylaniline, 4-amino-3-methoxy-N,N-diethylaniline, 4-amino-3-methyl-N-ethyl-N-β-methoxyethylaniline, 4-amino-3-methoxy-N-ethyl-N-β-methoxyethylaniline, 4-amino-3-β-methanesulfonamidoethyl-N,N-diethylaniline and the salts thereof (e.g., the sulfate, hydrochloride, sulfite, p-toluenesulfonate, etc.). In addition, those developing agents described in U.S. Pat. Nos. 2,193,015, 2,592,364, Japanese Pat. Application (OPI) No. 64933/73, L. F. A. Mason, *Photographic Processing Chemistry*, pp. 226 – 229, Focal Press, London, (1966), and the like can also be used.

Also, the above-described compounds can be used in combination with 3-pyrazolidones. If necessary, various additives can be added to the color developing solution. For example, a development accelerator (e.g., various pyridinium compounds described in U.S. Pat. Nos. 2,648,604, 3,671,247, etc., cationic compounds, potassium nitrate, sodium nitrate, polyethylene glycol condensates described in U.S. Pat. Nos. 2,533,990, 2,577,127, 2,950,970, etc., and the derivatives thereof, nonionic compounds such as polythioethers represented by the compounds described in British Pat. Nos. 1,020,033 and 1,020,032, polymers having a sulfite ester group represented by the compounds described in U.S. Pat. No. 3,068,097, organic amines such as pyridine, ethanolamine, etc., benzyl alcohol, hydrazines, and the like), an anti-fogging agent (e.g., potassium bromide, potassium iodide, nitrobenzimidazoles described in U.S. Pat. Nos. 2,496,940 and 2,656,271, mercaptobenzimidazole, 5-methylbenzotriazole, 1-phenyl-5-mercaptotetrazole, compounds described in U.S. Pat. Nos. 3,113,864, 3,342,596, 3,295,976, 3,615,522, 3,597,199, etc., thiosulfonyl compounds described in British Pat. No. 972,211, phenazine-N-oxides described in Japanese Pat. Publication No. 41675/71, anti-fogging agents described in *Kagaku Shashin Binran* (*Handbook of Photographic Science*), II, pp. 29 – 47, etc.), stain or sludge-preventing agents described in U.S. Pat. Nos. 3,161,513, 3,161,514, British Pat. Nos. 1,030,442, 1,144,481, 1,251,558, an inter-image effect-accelerating agent described in U.S. Pat. No. 3,536,487, etc., can be incorporated in the photographic developer solution.

The light-sensitive material comprising the photographic emulsion of the present invention is fixed, after development-processing, in a conventional manner. In some cases, the bleaching may be conducted simultaneously with or separately from the fixing. Where the bleaching and fixing are conducted at the same time, a bleach-fixing bath containing both a bleaching agent and a fixing agent is used. Many compounds can be used as the bleaching agent. Of these, ferricyanic acid salts, dichromates, water-soluble cobalt (III) salts, water-soluble copper (II) salts, water-soluble quinones, nitrosophenols, compounds of multivalent metals such as iron (III), cobalt (III), copper (II), etc., and an organic acid, in particular, complex salts between these multivalent metal cations and organic acids (e.g., metal complex salts of ethylenediaminetetraacetic acid, nitrilotriacetic acid, iminodiacetic acid, N-hydroxyethylethylenediaminetriacetic acid or like aminopolycarboxylic acids, malonic acid, tartaric acid, malic acid, diglycolic acid, dithioglycolic acid; 2,6-dipicolinic acidcopper complex salt; etc.), peroxides (e.g., alkylperacids, persulfates, permanganates, hydrogen peroxide, etc.), hypochlorite, chlorine, bromine, and the like are used. Bleaching, fixing or bleach-fixing is described in U.S. Pat. No. 3,582,322, etc.

A bleaching accelerator as described in U.S. Pat. Nos. 3,042,520, 3,241,966, Japanese Pat. Publication Nos. 8506/70, 8836/70, etc., can be added to this processing solution, if desired.

The present invention can be applied to various silver halide emulsions for color or black-and-white light-sensitive materials. Such emulsions include, e.g., emulsions for color positives, emulsions for color papers, emulsions for color negatives, emulsions for color reversal photographic materials (which may contain couplers), photographic light-sensitive materials for the graphic arts (e.g., lith films, etc.), emulsions for light-sensitive materials for recording cathode ray tube displays, emulsions for X-ray recording, light-sensitive materials (in particular, light-sensitive materials for direct or indirect photographing using an intensifying screen), emulsions for use in a colloid transfer process (described in, e.g., U.S. Pat. No. 2,716,059, etc.), emulsions for use in a silver salt diffusion transfer process (described in, e.g. U.S. Pat. Nos. 2,352,014, 2,543,181, 3,020,155, 2,861,185, etc.), emulsions for use in a color diffusion transfer process (described in, e.g., U.S. Pat. Nos. 3,087,817, 3,185,567, 2,983,606, 3,253,915, 3,227,550, 3,227,551, 3,227,552, 3,415,644, 3,415,645, 3,415,646, etc.), emulsions for use in a dye transfer process (described in, e.g., U.S. Pat. No. 2,882,156, etc.), emulsions for use in a silver dye-bleaching process (described in Friedman, *History of Color Photography*, particularly Chapter 24, American Photographic Publishers Co., (1944), *British Journal of Photography*, Vol. 111, pp. 308 – 309 (Apr. 7, 1964), etc.), emulsions for materials for recording print-out images (described in, e.g., U.S. Pat. No. 2,369,449, Belgian Pat. Nos. 704,255, etc.), emulsions for print-out light-sensitive materials of the light-developable type (described in, e.g., U.S. Pat. Nos. 3,033,682, 3,287,137, etc.), emulsions for heat developable light-sensitive materials (described in, e.g., U.S. Pat. Nos. 3,152,904, 3,312,550, 3,148,122, British Pat.

No. 1,110,046, etc.), emulsions for physically developable light-sensitive materials (described in, e.g., British Pat. Nos. 920,277, 1,131,238, etc.), and the like.

A feature of the present invention lies in the discovery of the supersensitizing action by the combined use of the sensitizing dye represented by the general formula (I) and the sensitizing dye represented by the general formula (II). Which combination of sensitizing dyes will give rise to supersensitization is difficult to predict only from the apparent chemical structural formulae. Apparently a slight difference in chemical structure greatly influences supersensitization.

The dye represented by the general formula (I) and the dye represented by the general formula (II) both are monomethinecyanine dyes. The chemical structural feature of the dye of the general formula (I) is that at least one basic nucleus is a benzothiazole nucleus, a naphthothiazole nucleus, a benzoselenazole nucleus or a naphthoselenazole nucleus. On the other hand, the chemical structural feature of the dye of the general formula (II) is that at least one basic nucleus is a benzimidazole nucleus or a naphthoimidazole nucleus. It is surprising that supersensitization is found between monomethinecyanine dyes having different chemical structures.

Another feature of the present invention is that the spectral sensitization distribution is sharply cut on the longer wavelength side and also that a high blue sensitivity is obtained with the above-described combination of dyes giving rise to supersensitization. Therefore, when the photographic emulsion of the present invention is used for a blue-sensitive layer of a color photographic element, the color separation from a green-sensitive layer is improved and excellent color reproduction becomes possible. On the other hand, in the case of a blue-sensitization of a black-and-white photographic element, it becomes possible to handle under a comparatively bright safe light visible to the naked eye.

A further feature of the present invention is that a silver halide photographic emulsion which does not substantially give rise to any dye stain resulting from the dyes is obtained and also that a high blue sensitivity is obtained.

The dye represented by the general formula (I) and the dye represented by the general formula (II) both possess as a substituent in the nitrogen position an alkyl group containing a sulfo group or a carboxy group. It is unexpected that, while the dyes leave considerable dye stain when each is used alone, dye stain is substantially removed when the dyes are used in combination.

Further, even when the dyes are used in the copresence of anionic compounds which are usually believed to inhibit spectrally sensitization (e.g., an irradiation-preventing dye having a sulfo group in the chemical structural formula thereof, a gelatin-aggregating agent, etc.) and/or an incorporated-type coupler for color light-sensitive materials, the supersensitizing combination of the present invention provides high blue sensitivity.

Still a further feature of the present invention is that even when a color image-forming coupler is incorporated in a photographic emulsion, the combination of the supersensitizing dyes of the present invention does not give rise to a substantial reduction in the spectral sensitivity when the emulsion is allowed to stand as a solution or during storage of the light-sensitive materials before processing.

The present invention will now be illustrated in greater detail by reference to the following non-limiting examples of the preferred embodiments of the present invention. Unless otherwise indicated herein, all parts, percents, ratios and the like are by weight.

EXAMPLE 1

Sensitizing dyes were incorporated, individually or in combination, in a silver bromoiodide emulsion (AgI:AgBr= 7 mol % : 93 mol %; gelatin (g)/AgNO$_3$(g) = 1.3; 0.53 mol silver salt/kg emulsion) to prepare silver halide photographic emulsions. The mean grain size of the silver halide grains was 0.70 $\mu$m.

Each of the emulsions was coated on a cellulose triacetate film support and, after drying, wedge-exposed at the same time through a filter, SC-46, made by Fuji Photo Film Co., Ltd. (a yellow filter transmitting light longer than 460 nm in wavelength and having the spectral percent transmittance as shown in the figure) for 1/50 second using a 64 lux day light color (corresponding to 5400° K) light source. Then, each sample was development-processed for 6 minutes at 20° C using a developer having the following composition, then subjected to stopping fixing and washing, followed by drying.

| Composition of the Developer: | |
|---|---|
| Metol | 2 g |
| Sodium Sulfite (anhydrous) | 40 g |
| Hydroquinone | 4 g |
| Sodium Carbonate (monohydrate) | 28 g |
| Potassium Bromide | 1 g |
| Water to make | 1 l |

The density of the thus-processed samples was measured using a P-type densitometer made by Fuji Photo Film Co., Ltd. to obtain the sensitivity and fog. In determining the sensitivity, a density of fog + 0.10 was taken as a standard optical density, and the sensitivity was indicated in terms of the reciprocal of the exposure amount necessary. The thus-obtained results are shown in Table 1 as relative values taking the sensitivities of Run. No. 12 and Run No. 22 as 100.

TABLE 1

| Run No. | Sensitizing Dye and Amount Added ($\times 10^{-5}$ mol/AgBrI mol) | | Specific Sensitivity | Fog |
|---|---|---|---|---|
| 11 | I-3 (1.7) | | 93.3 | 0.09 |
| 12 | I-3 (3.4) | | 100 | 0.09 |
| 13 | I-3 (6.8) | | 97.8 | 0.10 |
| 14 | II-1 (1.7) | | 52.5 | 0.10 |
| 15 | II-1 (3.4) | | 57.5 | 0.10 |
| 16 | II-1 (6.8) | | 52.5 | 0.11 |
| 17 | I-3 (1.7) | II-1 (5.1) | 145 | 0.10 |
| 18 | I-3 (3.4) | II-1 (3.4) | 148 | 0.10 |
| 19 | I-3 (5.1) | II-1 (1.7) | 148 | 0.10 |
| 21 | I-6 (1.7) | | 83.2 | 0.09 |
| 22 | I-6 (3.4) | | 100 | 0.09 |
| 23 | I-6 (6.8) | | 87.1 | 0.10 |
| 24 | II-4 (1.7) | | 41.7 | 0.09 |
| 25 | II-4 (3.4) | | 42.7 | 0.09 |
| 26 | II-4 (6.8) | | 41.7 | 0.09 |
| 27 | I-6 (1.7) | II-4 (5.1) | 141 | 0.09 |
| 28 | I-6 (3.4) | II-4 (3.4) | 145 | 0.09 |
| 29 | I-6 (5.1) | II-4 (1.7) | 145 | 0.09 |

From the results shown in Table 1, it is seen that excellent supersensitization can be obtained.

EXAMPLE 2

The dye combinations of Run Nos. 17 to 19 and Run Nos. 27 to 29 in Example 1 were added in the same amounts to silver chlorobromide photographic emulsions (Br: 90 mol %; Cl: 10 mol %; gelatin content: 170 g/mol silver; silver content: 0.43 mol/l kg emulsion) containing α-(4-palmitamidophenoxy)-α-pivaloyl-4-sulfamoylacetanilide (as described in U.S. Pat. 3,408,194) as a yellow image-forming coupler, and each of the resulting emulsions was coated on a polyethylene film-coated photographic paper, followed by drying. Each of the coated samples (6 kinds) was subjected to the following color processings without exposure in order to examine the degree of color remaining due to the dyes of supersensitizing combination. When each sample was observed after processing, every sample was found to have substantially no color remaining and to be practically usable.

| Processing Step | Temperature | Time |
|---|---|---|
| Color Development | 30° C | 6 min |
| Stopping | 30° C | 2 min |
| Washing | 30° C | 2 min |
| Bleach-fixing | 30° C | 1 min and 30 sec |
| Washing | 30° C | 2 min |
| Stabilizing Bath | 30° C | 2 min |
| Drying | 30° C | |

Each processing solution employed possessed the following composition.

| Color Developer: | |
|---|---|
| Benzyl Alcohol | 12 ml |
| Diethylene Glycol | 3.5 ml |
| Sodium Hydroxide | 2.0 g |
| Sodium Sulfite | 2.0 g |
| Potassium Bromide | 0.4 g |
| Sodium Chloride | 1.0 g |
| Borax | 4.0 g |
| Hydroxylamine Sulfate | 2.0 g |
| Disodium Ethylenediaminetetraacetate (dihydrate) | 2.0 g |
| 4-Amino-3-methyl-N-ethyl-N-(β-methanesulfonamidoethyl)aniline Sesquisulfate (monohydrate) | 5.0 g |
| Water to make | 1 l |
| Stopping Bath: | |
| sodium Thiosulfate | 10 g |
| Ammonium Thiosulfate (70% aq. soln.) | 30 ml |
| Sodium Acetate | 5 g |
| Acetic Acid | 30 ml |
| Potassium Alum | 15 g |
| Water to make the total | 1 l |
| Bleach-fixing Solution: | |
| Ferric Sulfate | 20 g |
| Disodium Ethylenediaminetetraacetate (dihydrate) | 36 g |
| Sodium Carbonate (monohydrate) | 17 g |
| Sodium Sulfite | 5 g |
| Ammonium Thiosulfate (70% aq. soln.) | 100 ml |
| Boric Acid | 5 g |
| pH was adjusted to 6.8, and water was added to make the total 1 liter. | |
| Stabilizing Bath: | |
| Boric Acid | 5 g |
| Sodium Citrate | 5 g |
| Sodium Metaborate (tetrahydrate) | 3 g |
| Potassium Alum | 15 g |
| Water to make the total | 1 l |

While the invention has been described in detail and with reference to specific embodiments thereof, it will be apparent to one skilled in the art that various changes and modifications can be made therein without departing from the spirit and scope thereof.

What is claimed is:

1. A silver halide photographic emulsion containing, is supersensitizing amounts, at least one sensitizing dye represented by the following general formula (I)

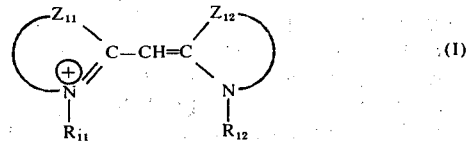

wherein $Z_{11}$ represents the atoms necessary to complete a thiazole nucleus, a selenazole nucleus, a benzothiazole nucleus, a benzoselenazole nucleus, a naphthothiazole nucleus or a naphthoselenazole nucleus; $Z_{12}$ represents the atoms necessary to complete a naphthothiazole nucleus, or a naphthoselenazole nucleus; and $R_{11}$ and $R_{12}$ each represents an aliphatic group with at least one of $R_{11}$ and $R_{12}$ having a carboxy or sulfo group; and at least one sensitizing dye represented by the following general formula (II)

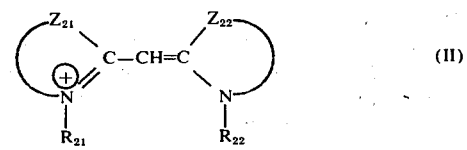

wherein $Z_{21}$ represents the atoms necessary to complete a thiazole nucleus, a benzothiazole nucleus, a naphthothiazole nucleus, a selenazole nucleus, a benzoselenazole nucleus or a napththoselenazole nucleus; $Z_{22}$ represents the atoms necessary to complete an imidazole nucleus, a benzimidazole nucleus or a naphthoimidazole nucleus; and $R_{21}$ and $R_{22}$ each represents an aliphatic group with at least one of $R_{21}$ and $R_{22}$ having a carboxy or sulfo group.

2. The silver halide photographic emulsion as described in claim 1, wherein the sensitizing dye represented by the general formula (I) has the general formula (III)

$$\begin{array}{c} Z_{31} \underset{\underset{R_{31}}{|}}{\overset{S}{\underset{N}{\bigoplus}}} C-CH=C \overset{S}{\underset{\underset{R_{32}}{|}}{\underset{N}{\diagdown}}} Z_{32} \end{array} \quad (III)$$

wherein $Z_{31}$ represents the atoms necessary to complete a benzothiazole nucleus or a naphthothiazole nucleus; $Z_{32}$ represents the atoms necessary to complete a naphthothiazole nucleus; $R_{31}$ represents an —$A_{31}$—$SO_3H$ group or an —$A_{31}$ —COOH group, wherein $A_{31}$ represents an alkylene group which may be substituted with a hydroxy group; $R_{32}$ represents an alkyl group which may be substituted with a hydroxy group, an —$A_{32}$—$SO_3H$ group or an —$A_{32}$—COOH group, wherein $A_{32}$ is the same as defined with respect to $A_{31}$.

3. The silver halide photographic emulsion as described in claim 1, wherein the sensitizing dye represented by the general formula (II) has the general formula (IV)

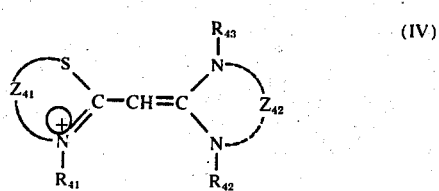

wherein $Z_{41}$ represents the atoms necessary to complete a naphthothiazole nucleus; $Z_{42}$ represents the atoms necessary to complete a benzimidazole nucleus or a naphthoimidazole nucleus; $R_{41}$ represents an alkyl group which may be substituted with a hydroxy group, an $-A_{41}-SO_3H$ group or an $-A_{41}-COOH$ group wherein $A_{41}$ represents an alkylene group which may be substituted with a hydroxy group; $R_{42}$ represents an $-A_{42}-SO_3H$ group or an $-A_{42}-COOH$ group wherein $A_{42}$ is the same as defined with respect to $A_{41}$; and $R_{43}$ represents an alkyl group, a hydroxyalkyl group, an acyloxyalkyl group or an alkoxyalkyl group.

4. The silver halide photographic emulsion as described in claim 1, wherein the sensitizing dye represented by the general formula (I) has the general formula (III)

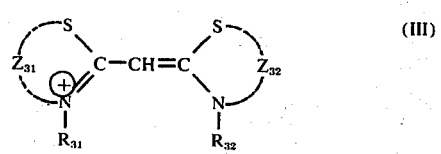

wherein $Z_{31}$ represents the atoms necessary to complete a benzothiazole nucleus or a naphthothiazole nucleus; $Z_{32}$ represents the atoms necessary to complete a naphthothiazole nucleus; $R_{31}$ represents an $-A_{31}-SO_3H$ group or an $-A_{31}-COOH$ group, wherein $A_{31}$ represents an alkylene group which may be substituted with a hydroxy group; $R_{32}$ represents an alkyl group which may be substituted with a hydroxy group, an $-A_{32}-SO_3H$ group or an $A_{32}-COOH$ group wherein $A_{32}$ is the same as defined with respect to $A_{31}$; and the sensitizing dye represented by the general formula (II) has the general formula (IV)

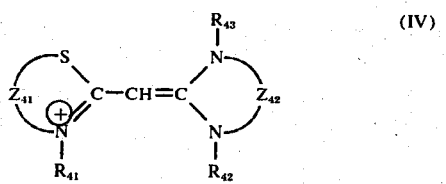

wherein $Z_{41}$ represents the atoms necessary to complete a naphthothiazole nucleus; $Z_{42}$ represents the atoms necessary to complete a benzimidazole nucleus or a naphthoimidazole nucleus; $R_{41}$ represents an alkyl group which may be substituted with a hydroxy group, an $-A_{41}-SO_3H$ group or an $-A_{41}-COOH$ group wherein $A_{41}$ represents an alkylene group which may be substituted with a hydroxy group; $R_{42}$ represents an $-A_{42}-SO_3H$ group or an $-A_{42}-COOH$ group wherein $A_{42}$ is the same as defined with respect to $A_{41}$; and $R_{43}$ represents an alkyl group, a hydroxyalkyl group, an acyloxyalkyl group or an alkoxyalkyl group.

5. The silver halide photographic emulsion as described in claim 1, wherein the sensitizing dye represented by the general formula (I) has the general formula (V)

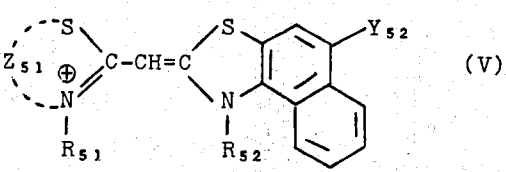

wherein $Z_{51}$ represents the atoms necessary to complete a benzothiazole nucleus or a naphtho[1,2-d]thiazole nucleus, said benzothiazole nucleus being substituted in the 5-position thereof with a halogen atom; $R_{51}$ represents an $-A_{31}-SO_3H$ group or an $-A_{31}-COOH$ group wherein $A_{31}$ represents an alkylene group which may be substituted with a hydroxy group; $R_{52}$ represents an alkyl group which may e substituted with a hydroxy group; and $Y_{52}$ represents a hydrogen atom or a halogen atom; and the sensitizing dye represented by the general formula (II) has the general formula (IV)

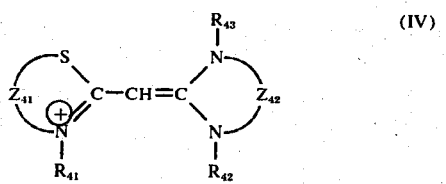

wherein $Z_{41}$ represents the atoms necessary to complete a naphthothiazole nucleus; $Z_{42}$ represents the atoms necessary to complete a benzimidazole nucleus or a naphthoimidazole nucleus; $R_{41}$ represents an alkyl group which may be substituted with a hydroxy group, an $-A_{41}-SO_3H$ group or an $-A_{41}-COOH$ group wherein $A_{41}$ represents an alkylene group which may be substituted with a hydroxy group; $R_{42}$ represents an $-A_{42}-SO_3H$ group or an $-A_{42}-COOH$ group wherein $A_{42}$ is the same as defined with respect to $A_{41}$; and $R_{43}$ represents an alkyl group, a hydroxyalkyl group, an acyloxyalkyl group or an alkoxyalkyl group.

6. The silver halide photographic emulsion as described in claim 1, wherein the sensitizing dye represented by the general formula (I) has the general formula (III)

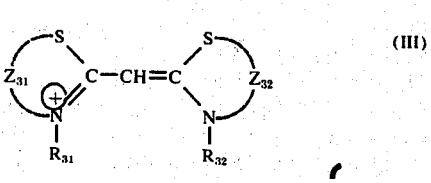

wherein $Z_{31}$ represents the atoms necessary to complete a benzothiazole nucleus or a naphthothiazole nucleus; $Z_{32}$ represents the atoms necessary to complete a naphthothiazole nucleus; $R_{31}$ represents an $-A_{31}-SO_3H$ group or an $-A_{31}-COOH$ group wherein $A_{31}$ represents an alkylene group which may be substituted with a hydroxy group; $R_{32}$ represents an alkyl group which may be substituted with a hydroxy group, an $-A_{32}-SO_3H$ group or an $-A_{32}-COOH$ group wherein $A_{32}$ is the same as defined with respect to $A_{31}$; and the sensitizing dye represented by the general formula (II) has the general formula (VI)

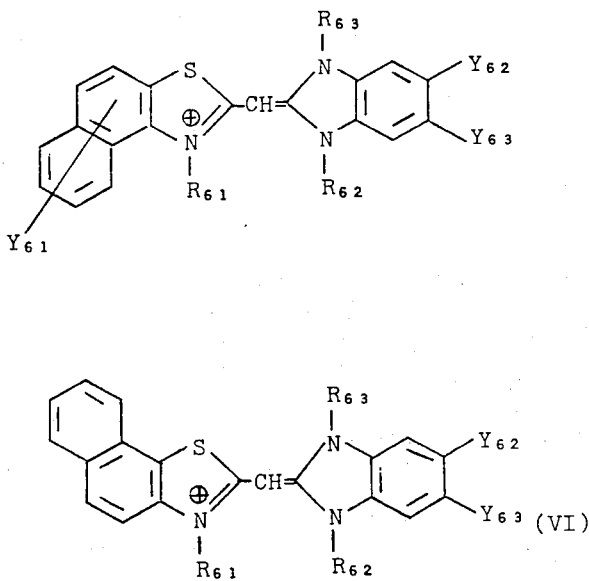

wherein $R_{61}$ represents an alkyl group which may be substituted with a hydroxy group, a $-A_{41}-SO_3H$ group or a $-A_{41}-COOH$ group wherein $A_{41}$ represents an alkylene group which may be substituted with a hydroxy group; $R_{62}$ represents a $-A_{42}-SO_3H$ group or a $-A_{42}-COOH$ group wherein $A_{42}$ is the same as defined with respect to $A_{41}$; $R_{63}$ represents an alkyl group, a hydroxyalkyl group, an acyloxyalkyl group or an alkoxyalkyl group; $Y_{61}$ represents a hydrogen atom, an alkyl group or a halogen atom; $Y_{62}$ represents a hydrogen atom or a halogen atom; and $Y_{63}$ represents a hydrogen atom, a halogen atom, an alkylsulfonyl group or an alkoxycarbonyl group.

7. The silver halide photographic emulsion as described in claim 1, wherein the sensitizing dye represented by the general formula (I) has the general formula (V)

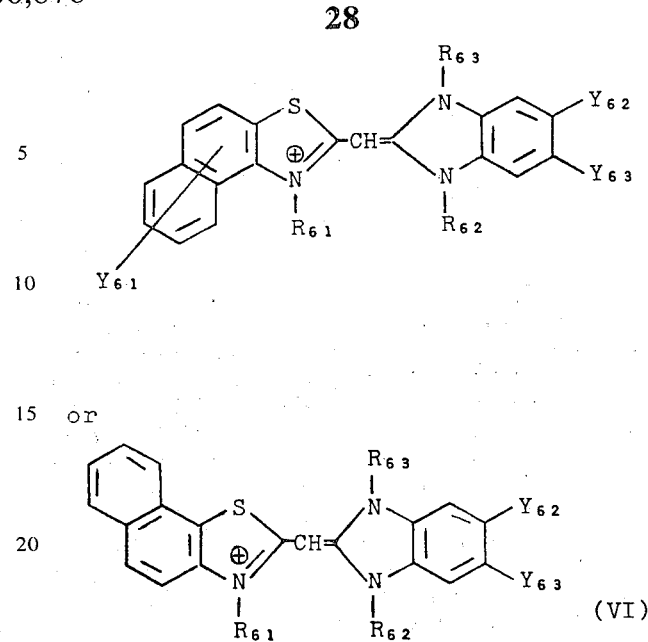

wherein $Z_{51}$ represents the atoms necessary to complete a benzothiazole nucleus or a naphtho[1,2-d]thiazole nucleus; $R_{51}$ represents a $-A_{31}-SO_3H$ group or a $-A_{31}-COOH$ group, wherein $A_{31}$ represents an alkylene group which may be substituted with a hydroxy group; $R_{52}$ represents an alkyl group which may be substituted with a hydroxy group; and $Y_{52}$ represents a hydrogen atom or a halogen atom; and the sensitizing dye represented by the general formula (II) has the general formula (VI)

or wherein $R_{61}$ represents an alkyl group which may be substituted with a hydroxy group, a $-A_{41}-SO_3H$ group or a $-A_{41}-COOH$ group wherein $A_{41}$ represents an alkylene group which may be substituted with a hydroxy group; $R_{62}$ represents a $-A_{42}-SO_3H$ group or a $-A_{42}-COOH$ group wherein $R_{42}$ is the same as defined with respect to $A_{41}$; $R_{63}$ represents an alkyl group, a hydroxyalkyl group, an acyloxyalkyl group or an alkoxyalkyl group; $Y_{61}$ represents a hydrogen atom, an alkyl group or a halogen atom; $Y_{62}$ represents a hydrogen atom or a halogen atom; and $Y_{63}$ represents a hydrogen atom, a halogen atom, an alkylsulfonyl group or an alkoxycarbonyl group.

8. The silver halide photographic emulsion as described in claim 7, wherein $R_{51}$ represents an unsubstituted sulfoalkyl group or an unsubstituted carboxyalkyl group, and $R_{52}$ represents an unsubstituted alkyl group.

9. The silver halide photographic emulsion as described in claim 7, wherein $R_{61}$ and $R_{62}$ each represents an unsubstituted carboxyalkyl group or an unsubstituted sulfoalkyl group; $R_{63}$ represents an alkyl group; $Y_{61}$ represents a hydrogen atom; and $Y_{62}$ and $Y_{63}$ both represent halogen atoms.

10. The silver halide photographic emulsion as described in claim 7, wherein $R_{51}$ represents an unsubstituted sulfoalkyl group or an unsubstituted carboxyalkyl group; $R_{52}$ represents an unsubstituted alkyl group; $R_{61}$ represents an unsubstituted alkyl group, an unsubstituted carboxyalkyl group or an unsubstituted sulfoalkyl group; $R_{62}$ represents an unsubstituted carboxyalkyl group or an unsubstituted sulfoalkyl group; $R_{63}$ represents an alkyl group; $Y_{61}$ represents a hydrogen atom; and $Y_{62}$ and $Y_{63}$ both represents halogen atoms.

11. The silver halide photographic emulsion as described in claim 1, wherein the sensitizing dye represented by the general formula (I) and the sensitizing dye represented by the general formula (II) each is present in an amount of from about $2 \times 10^{-2}$ mol to about $1 \times 10^{-3}$ mol per mol of silver halide.

12. The silver halide photographic emulsion as described in claim 11, wherein the sensitizing dye represented by the general formula (I) is present in a molar proportion of from about 1:10 to 10:1 to the sensitizing dye represented by the general formula (II).

13. The silver halide photographic emulsion as described in claim 1, additionally containing a yellow-forming coupler.

14. The silver halide photographic emulsion as described in claim 4, additionally containing a yellow-forming coupler.

15. The silver halide photographic emulsion as described in claim 7, additionally containing a yellow-forming coupler.

16. A photographic light-sensitive material, which comprises a support having thereon the photographic emulsion described in claim 1.

17. A color photographic light-sensitive material, which comprises at least two differently sensitive silver halide emulsion layers, at least one layer containing a coupler and at least one layer comprising the photographic emulsions as described in claim 1.

* * * * *